United States Patent
Chen et al.

(10) Patent No.: US 12,294,507 B2
(45) Date of Patent: May 6, 2025

(54) SERVICE LEVEL CONFIGURATION METHOD AND APPARATUS

(71) Applicant: HUAWEI TECHNOLOGIES CO., LTD., Guangdong (CN)

(72) Inventors: Lihao Chen, Beijing (CN); Jiayi Zhang, Beijing (CN); Lei Li, Beijing (CN); Shuang Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/868,859

(22) Filed: Jul. 20, 2022

(65) Prior Publication Data

US 2022/0368608 A1 Nov. 17, 2022

Related U.S. Application Data

(63) Continuation of application No. PCT/CN2020/115994, filed on Sep. 17, 2020.

(30) Foreign Application Priority Data

Jan. 21, 2020 (CN) .......................... 202010071882.6

(51) Int. Cl.
*H04L 41/50* (2022.01)
*H04L 41/0816* (2022.01)
*H04L 43/0852* (2022.01)

(52) U.S. Cl.
CPC ...... *H04L 41/5032* (2013.01); *H04L 41/0816* (2013.01); *H04L 43/0852* (2013.01)

(58) Field of Classification Search
CPC ............. H04L 41/5032; H04L 41/0816; H04L 43/0852; H04L 47/2425; H04L 47/2433;
(Continued)

(56) References Cited

U.S. PATENT DOCUMENTS 6,167,445 A 12/2000 Gai et al.
6,976,087 B1 * 12/2005 Westfall .............. H04L 43/0852
370/351
(Continued)

FOREIGN PATENT DOCUMENTS

CN 101005367 A 7/2007
CN 102185834 A 9/2011
(Continued)

OTHER PUBLICATIONS

European Patent Office Search Report for Application No. 20916041.5 dated Apr. 26, 2023, 9 pages.
(Continued)

*Primary Examiner* — Patrice L Winder

(57) ABSTRACT

This application discloses a service level configuration methods and apparatuses, and belongs to the field of communications network technologies. According to an example method, a target service level used by a first forwarding node to forward a data flow is directly determined based on a transmission parameter of the data flow and service level information of the first forwarding node, and service level configuration is performed on the first forwarding node. Because a transmission parameter of the target service level of the first forwarding node and the transmission parameter of the data flow meet a first target condition, if the first target condition is a delay requirement required by a special service and the first forwarding node transmits the data flow by using the target service level, transmission of the data flow may meet the delay requirement required by the special service.

21 Claims, 6 Drawing Sheets

Table 1

| Service level | D (ms) | b (bit) | r (kbps) |
|---|---|---|---|
| A | 2 | 657 | 125 |
| B | 4 | 1323 | 250 |
| C | 10 | 3323 | 625 |

Table 2

| Service level | D (ms) | b (bit) | r (kbps) |
|---|---|---|---|
| A | 0.5 | 1230 | 2500 |
| B | 1 | 2480 | 2500 |
| C | 2 | 4980 | 2500 |
| D | 4 | 9980 | 2500 |

Forwarding node

(58) Field of Classification Search
CPC .. H04L 41/5022; H04L 47/24; H04L 47/2408
See application file for complete search history.

(56) References Cited

U.S. PATENT DOCUMENTS

| | | | | |
|---|---|---|---|---|
| 7,568,045 | B1* | 7/2009 | Agrawal | H04L 41/147 709/233 |
| 7,940,756 | B1* | 5/2011 | Duffy | H04L 47/2475 709/225 |
| 10,938,717 | B1* | 3/2021 | Sundararajan | H04L 47/2441 |
| 2003/0033467 | A1* | 2/2003 | Yoshizawa | H04L 41/5022 710/305 |
| 2006/0098672 | A1* | 5/2006 | Schzukin | H04L 47/10 370/412 |
| 2007/0140113 | A1 | 6/2007 | Gemelos | |
| 2008/0025218 | A1* | 1/2008 | Liu | H04L 47/2433 370/254 |
| 2011/0242974 | A1 | 10/2011 | Das et al. | |
| 2011/0317584 | A1 | 12/2011 | Wu | |
| 2012/0144063 | A1* | 6/2012 | Menchaca | H04L 47/2475 709/240 |
| 2013/0346590 | A1* | 12/2013 | Scurtu | H04L 65/80 709/224 |
| 2015/0163162 | A1* | 6/2015 | DeCusatis | H04L 41/5054 709/224 |
| 2015/0188821 | A1* | 7/2015 | Campbell | H04L 47/20 370/237 |
| 2016/0021596 | A1 | 1/2016 | Hui et al. | |
| 2017/0195171 | A1* | 7/2017 | Wohlert | H04L 67/30 |
| 2017/0353383 | A1* | 12/2017 | Hughes | H04L 41/0894 |
| 2018/0091369 | A1* | 3/2018 | Cunningham | H04L 41/0816 |
| 2018/0337862 | A1* | 11/2018 | Sharma | H04L 43/0829 |
| 2020/0259740 | A1* | 8/2020 | Wetterwald | H04L 43/0876 |
| 2020/0274794 | A1 | 8/2020 | Zhang et al. | |
| 2020/0366617 | A1* | 11/2020 | Kommula | H04L 47/2433 |
| 2021/0092047 | A1* | 3/2021 | Dutta | H04L 45/34 |

FOREIGN PATENT DOCUMENTS

| | | |
|---|---|---|
| CN | 106059960 A | 10/2016 |
| CN | 108737128 A | 11/2018 |
| CN | 109617810 A | 4/2019 |
| EP | 4024778 A1 | 7/2022 |
| JP | H09238160 A | 9/1997 |
| JP | 2002305538 A | 10/2002 |
| JP | 2007142827 A | 6/2007 |
| KR | 20160150060 A | 12/2016 |
| WO | 9508230 A1 | 3/1995 |

OTHER PUBLICATIONS 802.1Qcc-2018—IEEE Standard for Local and Metropolitan Area Networks—Bridges and Bridged Networks—Amendment 31: Stream Reservation Protocol (SRP) Enhancements and Performance Improvements, total 208 pages.
Ericsson et al., "IEEE 802.1 TSN An Introduction", Date: Jul. 16, 2019, IEEE 802.11-19/1298r1, total: 18 pages.
International Search Report and Written Opinion issued in PCT/CN2020/115994, dated Dec. 18, 2020, 9 pages, English translation of search report received Jul. 20, 2022.
Chinese Office Action for Application No. 202010071882 dated Mar. 17, 2023, 7 pages.

* cited by examiner

SERVICE LEVEL CONFIGURATION METHOD AND APPARATUS

CROSS-REFERENCE TO RELATED APPLICATIONS

This application is a continuation of International Application No. PCT/CN2020/115994, filed on Sep. 17, 2020, which claims priority to Chinese Patent Application No. 202010071882.6, filed on Jan. 21, 2020. The disclosures of the aforementioned applications are hereby incorporated by reference in their entireties

TECHNICAL FIELD

This application relates to the field of communications network technologies, and in particular, to a service level configuration method and apparatus, a computing device, a network device, and a computer-readable storage medium.

BACKGROUND

Currently, different special services may have different service requirements. Technical personnel may allocate a priority to a data flow of each special service based on service requirements of different special services, but the technical personnel do not allocate a priority to a data flow of a common service. When a plurality of data flows are transmitted through a forwarding node in an internet protocol (IP) network, the forwarding node may transmit the plurality of data flows based on priorities of the plurality of data flows. Transmission of a service flow of a specific priority cannot meet a delay requirement of a special service.

SUMMARY

Embodiments of this application provide a service level configuration method and apparatus, to ensure that transmission of a data flow can meet a delay requirement required by a special service. Technical solutions are as follows:

According to a first aspect, a service level configuration method is provided. The method includes:
  first obtaining a transmission parameter of a data flow and service level information of a first forwarding node; determining, from at least one service level of the first forwarding node based on the transmission parameter of the data flow and the service level information of the first forwarding node, a target service level used by the first forwarding node to forward the data flow; and sending a service level configuration request to the first forwarding node.

The service level information of the first forwarding node includes a transmission parameter of at least one service level of the first forwarding node, a transmission parameter of the target service level of the first forwarding node and the transmission parameter of the data flow meet a first target condition, and the service level configuration request is used to indicate to use the target service level of the first forwarding node to transmit the data flow.

Based on the foregoing implementation, the target service level used by the first forwarding node to forward the data flow is directly determined based on the transmission parameter of the data flow and the service level information of the first forwarding node, and service level configuration is performed on the first forwarding node. Because the transmission parameter of the target service level of the first forwarding node and the transmission parameter of the data flow meet the first target condition, if the first target condition is a delay requirement required by a special service and the first forwarding node transmits the data flow by using the target service level, transmission of the data flow may meet the delay requirement required by the special service.

In a possible implementation, the transmission parameter of the data flow includes a transmission delay, a burst size, and a transmission bandwidth of the data flow.

A transmission parameter of one service level includes a forwarding delay, a service burst size, and a service bandwidth that correspond to the service level, where the service burst size is a maximum burst size allowed when at least one data flow is forwarded by using the service level, and the service bandwidth is a maximum bandwidth allowed when at least one data flow is forwarded by using the service level.

In a possible implementation, the first target condition includes at least one of the following:
  a forwarding delay corresponding to the target service level of the first forwarding node is less than or equal to the transmission delay;
  a sum of the burst size and a burst size of a data flow currently served by the target service level of the first forwarding node is less than or equal to a service burst size corresponding to the target service level of the first forwarding node; and
  a sum of the transmission bandwidth and a transmission bandwidth of the data flow currently served by the target service level of the first forwarding node is less than or equal to a service bandwidth corresponding to the target service level of the first forwarding node.

In a possible implementation, the first target condition further includes:
  a sum of the forwarding delay corresponding to the target service level of the first forwarding node and a target delay is less than or equal to the transmission delay, where the target delay is an inherent delay of a transmission path of the data flow.

In a possible implementation, before the determining a target service level used by the first forwarding node to forward the data flow, the method further includes:
  obtaining service level information of a second forwarding node; and determining, from at least one service level of the second forwarding node based on the transmission parameter of the data flow, the service level information of the first forwarding node, and the service level information of the second forwarding node, a target service level used by the second forwarding node to forward the data flow, where the second forwarding node is a node other than the first forwarding node on the transmission path of the data flow, and the transmission parameter of the target service level of the first forwarding node, a transmission parameter of the target service level of the second forwarding node, and the transmission parameter of the data flow meet a second target condition.

In a possible implementation, the second target condition includes at least one of the following:
  a sum of the forwarding delay corresponding to the target service level of the first forwarding node and a forwarding delay corresponding to the target service level of the second forwarding node is less than or equal to the transmission delay;
  for either one of the first forwarding node and the second forwarding node, a sum of the burst size and a burst size of a data flow currently served by a target service level of the node is less than or equal to a service burst size corresponding to the target service level of the node; and a sum of the transmission bandwidth and a transmission bandwidth of the data flow currently served by the target service level of the node is less than or equal to a service bandwidth corresponding to the target service level of the node.

Based on the foregoing possible implementation, when a sum of forwarding delays corresponding to target service levels of forwarding nodes on the transmission path is less than or equal to the transmission delay of the data flow, if the forwarding nodes on the transmission path transmit the data flow by using the target service levels, it may be ensured that an actual transmission delay of the data flow can meet the transmission delay required by the service. When a sum of the burst size of the data flow and a burst size of a data flow currently served by the target service level of the forwarding node on the transmission path is less than or equal to a service burst size corresponding to the target service level, if the forwarding node on the transmission path transmits the data flow by using the target service level, it may be ensured that transmission of the data flow can still be completed while ensuring a service requirement even if a burst occurs on the data flow. When a sum of the transmission bandwidth of the data flow and a transmission bandwidth of the data flow currently served by the target service level of the forwarding node on the transmission path is less than or equal to a service bandwidth corresponding to the target service level of the forwarding node on the transmission path, if the forwarding node on the transmission path transmits the data flow by using the target service level, it may be ensured that an actual transmission bandwidth of the data flow can meet the transmission bandwidth required by the service.

In a possible implementation, the second target condition further includes:

a sum of the forwarding delay corresponding to the target service level of the first forwarding node, the forwarding delay corresponding to the target service level of the second forwarding node, and a target delay is less than or equal to the transmission delay, where the target delay is an inherent delay of the transmission path.

In a possible implementation, the inherent delay includes a transmission delay between nodes on the transmission path, a port delay of a forwarding node on the transmission path, and a task delay. The port delay is duration for the forwarding node to send a packet in the data flow to a port of the forwarding node, and the task delay is duration for the forwarding node to allocate a forwarding task for the packet in the data flow.

In a possible implementation, the method further includes:

when the burst size is greater than the service burst size corresponding to the target service level of the first forwarding node, sending a traffic shaping request to a node that is to be traffic shaped, where the traffic shaping request is used to indicate to perform traffic shaping on the data flow, and a burst size of the traffic shaped data flow is less than or equal to the service burst size corresponding to the target service level of the first forwarding node.

In a possible implementation, the node that is to be traffic shaped is a forwarding node located before the first forwarding node on the transmission path of the data flow, a target terminal, or an initial forwarding node on the transmission path, where the target terminal is configured to send the data flow.

In a possible implementation, the data flow includes at least one service flow.

According to a second aspect, a service level configuration method is provided, which is applied to a forwarding node. The method includes:

receiving a service level configuration request, and performing service level configuration based on the service level configuration request, to transmit a data flow by using a target service level of a first forwarding node.

The service level configuration request is used to indicate to use the target service level of the first forwarding node to transmit the data flow, and a transmission parameter of the target service level of the first forwarding node and a transmission parameter of the data flow meet a first target condition.

In a possible implementation, the transmission parameter of the data flow includes a transmission delay, a burst size, and a transmission bandwidth of the data flow.

The target service level of the first forwarding node is any one of at least one service level of the first forwarding node. A transmission parameter of one service level includes a forwarding delay, a service burst size, and a service bandwidth that correspond to the service level, where the service burst size is a maximum burst size allowed when at least one data flow is forwarded by using the service level, and the service bandwidth is a maximum bandwidth allowed when at least one data flow is forwarded by using the service level.

In a possible implementation, the first target condition includes at least one of the following:

a forwarding delay corresponding to the target service level of the first forwarding node is less than or equal to the transmission delay;

a sum of the burst size and a burst size of a data flow currently served by the target service level of the first forwarding node is less than or equal to a service burst size corresponding to the target service level of the first forwarding node; and a sum of the transmission bandwidth and a transmission bandwidth of the data flow currently served by the target service level of the first forwarding node is less than or equal to a service bandwidth corresponding to the target service level of the first forwarding node.

In a possible implementation, the first target condition further includes:

a sum of the forwarding delay corresponding to the target service level of the first forwarding node and a target delay is less than or equal to the transmission delay, where the target delay is an inherent delay of a transmission path.

In a possible implementation, the inherent delay includes a transmission delay between nodes on the transmission path, a port delay of a forwarding node on the transmission path, and a task delay of the forwarding node. The port delay is duration for the forwarding node to send a packet in the data flow to a port of the forwarding node, and the task delay is duration for the forwarding node to allocate a forwarding task for the packet in the data flow.

In a possible implementation, before the receiving a service level configuration request, the method further includes:

obtaining a transmission parameter of the at least one service level; and sending service level information of the first forwarding node to a control node, where the service level information includes the transmission parameter of the at least one service level of the first forwarding node.

In a possible implementation, the obtaining a transmission parameter of the at least one service level includes:

for any service level in the at least one service level, first obtaining a queuing delay of the service level, where the queuing delay is maximum duration for a packet in a data flow to wait in a forwarding queue corresponding to the service level; and determining, based on the queuing delay of the service level, a forwarding delay corresponding to the service level; determining, based on the forwarding delay corresponding to the service level, a port bandwidth of the first forwarding node, and a data forwarding amount corresponding to the service level, a maximum burst size corresponding to the service level; and determining, based on the port bandwidth of the first forwarding node and the data forwarding amount corresponding to the service level, a service bandwidth corresponding to the service level, where the data forwarding amount is a data amount of data to be forwarded from the forwarding queue corresponding to the service level at a single time.

In a possible implementation, the determining, based on the queuing delay of the service level, a forwarding delay corresponding to the service level includes:

determining the queuing delay of the service level as the forwarding delay corresponding to the service level; or determining a sum of the queuing delay of the service level and an inherent delay of the first forwarding node as the forwarding delay corresponding to the service level.

In a possible implementation, after the determining, based on the port bandwidth of the first forwarding node and the data forwarding amount corresponding to the service level, a service bandwidth corresponding to the service level, the method further includes:

allocating buffer space to the forwarding queue corresponding to the service level, where the buffer space is used to provide a packet for the forwarding queue.

In a possible implementation, a transmission parameter of one service level further includes a target identifier. When a maximum buffer size of the buffer space is greater than or equal to a service burst size corresponding to the service level corresponding to the forwarding queue, the target identifier is a first identifier, where the first identifier is used to indicate that a packet loss does not occur when the data flow is forwarded by using the service level. Otherwise, the target identifier is a second identifier, where the second identifier is used to indicate that a packet loss occurs when the data flow is forwarded by using the service level.

In a possible implementation, the transmission parameter of the one service level further includes a confidence probability corresponding to the service level, where the confidence probability is a probability that an actual forwarding delay generated when the data flow is forwarded by using the service level is less than or equal to the forwarding delay corresponding to the service level.

In a possible implementation, the data flow includes at least one service flow.

According to a third aspect, a service level configuration apparatus is provided, which is configured to perform the foregoing service level configuration method. Specifically, the service level configuration apparatus includes a functional module configured to perform the service level configuration method provided in the first aspect or any optional manner of the first aspect.

According to a fourth aspect, a service level configuration apparatus is provided, which is configured to perform the foregoing service level configuration method. Specifically, the service level configuration apparatus includes a functional module configured to perform the service level configuration method provided in the second aspect or any optional manner of the second aspect.

According to a fifth aspect, a computing device is provided. The computing device includes a processor and a memory, where the memory stores at least one instruction, and the instruction is loaded and executed by the processor, to implement an operation performed by the foregoing service level configuration method. Specifically, the computing device is configured to perform an operation performed by the service level configuration method provided in the first aspect or any optional manner of the first aspect.

According to a sixth aspect, a network device is provided. The network device includes a processor and a memory, where the memory stores at least one instruction, and the instruction is loaded and executed by the processor, to implement an operation performed by the foregoing service level configuration method. Specifically, the network device is configured to perform an operation performed by the service level configuration method provided in the second aspect or any optional manner of the second aspect.

According to a seventh aspect, a computer-readable storage medium is provided. The storage medium stores at least one instruction, and the instruction is loaded and executed by a processor, to implement an operation performed by the foregoing service level configuration method.

DESCRIPTION OF EMBODIMENTS

To make the objectives, technical solutions, and advantages of this application clearer, the following further describes the implementations of this application in detail with reference to the accompanying drawings.

Figure 1:
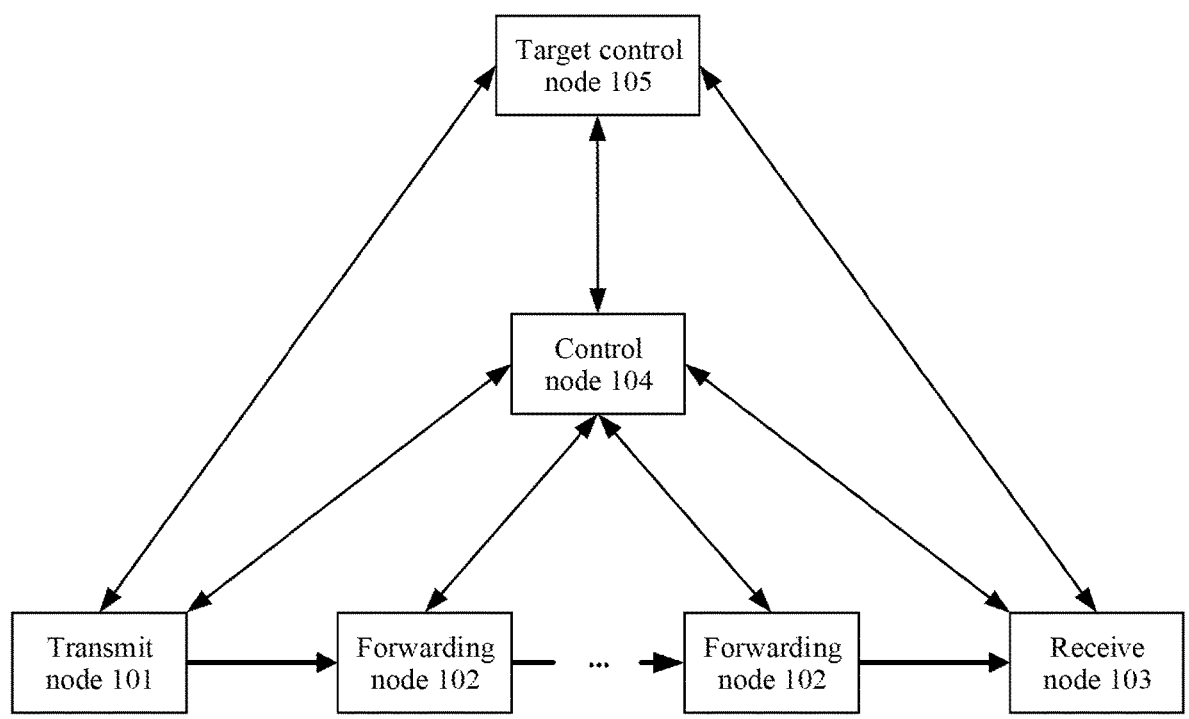
FIG. 1 is a schematic diagram of a service level configuration system according to an embodiment of this application.

FIG. 1 is a schematic diagram of a service level configuration system according to an embodiment of this application. The system 100 may include a transmit node 101, a forwarding node 102, a receive node 103, and a control node 104. The transmit node 101 is configured to send a data flow, and is a transmit end of the data flow. The transmit node 101 may be user equipment, for example, a mobile phone or a personal computer, or may be a computing device, for example, a server. There may be one or more transmit nodes 101 in the system 100. A hardware form and a quantity of transmit nodes 101 are not specifically limited in this embodiment of this application.

The forwarding node 102 is configured to transmit the data flow sent by the transmit node 101 to the receive node 103, where the forwarding node 102 may be a network device that has a forwarding function, for example, a switch or a router. There may be one or more forwarding nodes 102 in the system 100. A hardware form and a quantity of forwarding nodes 102 are not specifically limited in this embodiment of this application.

The receive node 103 is configured to receive the data flow transmitted by the forwarding node 102, and is a receive end of the data flow. The receive node 103 may be user equipment, for example, a mobile phone or a personal computer, may be a computing device, for example, a server, or may be a forwarding node that is located at an edge of a subnet and has a forwarding function. There may be one or more receive nodes 103 in the system 100. A hardware form and a quantity of receive nodes 103 are not specifically limited in this embodiment of this application.

The transmit node 101, at least one forwarding node 102, and the receive node 103 may form a transmission path of a data flow. The data flow may be a service-based service flow, and the data flow may have a transmission parameter required by the service, where the transmission parameter required by the service may be denoted as a transmission parameter of the data flow.

To enable the transmission parameter of the data flow on the transmission path to meet the service requirement, the transmit node 101, the forwarding node 102, or the receive node 103 on the transmission path may send the transmission parameter of the data flow to the control node 104, and each forwarding node 102 on the transmission path may send respective service level information to the control node 104, where the service level information of a forwarding node includes a transmission parameter of at least one service level of the forwarding node. For any forwarding node 102, the control node 104 is further configured to determine, from at least one service level of the forwarding node 102 based on the transmission parameter of the data flow and the service level information of the forwarding node 102, a target service level used by the forwarding node 102 to forward the data flow. The control node 104 may be further configured to send a service level configuration request to the forwarding node 102, and the forwarding node 102 performs service level configuration based on the received service level configuration request, so that the data flow may be subsequently transmitted by using the target service level of the forwarding node 102. The control node 104 may be a computing device having a computing function and a storage function, for example, a computing device such as a computer or a server. Some or all of the functions of the control node 104 may also be implemented by another device, for example, the forwarding node 102. The control node 104 is not specifically limited in this embodiment of this application.

In a possible implementation, the system 100 may further include a target control node 105. The target control node 105 is configured to obtain a transmission parameter of at least one data flow, where the transmission parameter of the at least one data flow may be uploaded to the target control node 105 by at least one transmit node 101 or at least one receive node 103. The target control node 105 may be further configured to send the transmission parameter of the at least one data flow to the control node 104. For any data flow, the control node 104 performs service level configuration based on the transmission parameter of the data flow and service level information of each forwarding node on a transmission path of the data flow. The target control node 105 may be further configured to receive a configuration response that corresponds to the data flow and that is sent by the control node 104, where the configuration response corresponding to the data flow is used to indicate a configuration result of service level configuration performed based on the data flow. The target control node 105 may be a computing device having a computing function and a storage function, for example, a computing device such as a computer or a server. Some or all of the functions of the target control node 105 may also be implemented by another device, for example, the forwarding node 102 or the control node 104. The target control node 105 is not specifically limited in this embodiment of this application.

It should be noted that, the control node 104 may further return, through a user network port, the configuration response corresponding to the data flow to any device that sends the transmission parameter of the data flow. The any device may be the transmit node 101, the forwarding node 102, the receive node 103, or the target control node 105.

Figure 2:
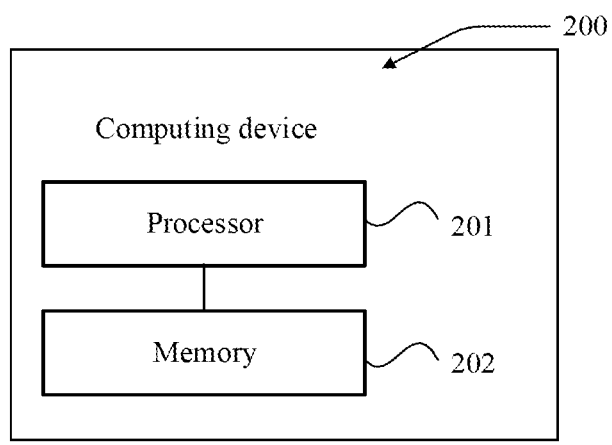
FIG. 2 is a schematic diagram of a structure of a computing device according to an embodiment of this application.

A control node may be any computing device. To further describe a hardware structure of the control node, refer to a schematic diagram of a structure of a computing device according to an embodiment of this application shown in FIG. 2. The computing device 200 may greatly vary due to different configurations or performance. The computing device 200 may include one or more processors (CPU) 201 and one or more memories 202, where the memory 202 stores at least one instruction, and the at least one instruction is loaded and executed by the processor 201, to implement a step performed by the control node in the following method embodiments. Apparently, the computing device 200 may further have components such as a wired or wireless network interface, a keyboard, and an input/output interface, to perform input/output. The computing device 200 may further include another component configured to implement a device function.

Figure 3:
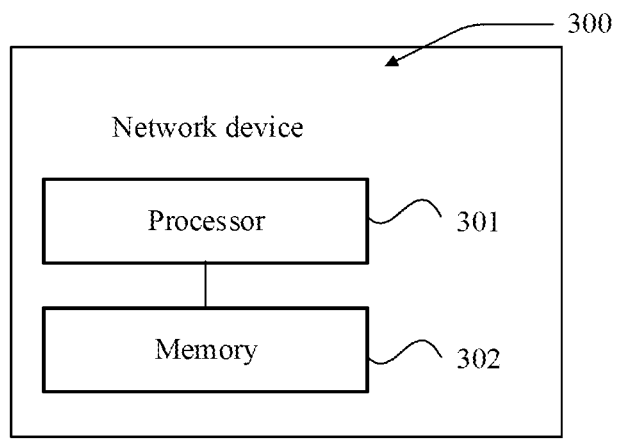
FIG. 3 is a schematic diagram of a structure of a network device according to an embodiment of this application.

A forwarding node may be a network device. To further describe a hardware structure of the forwarding node, refer to a schematic diagram of a structure of a network device according to an embodiment of this application shown in FIG. 3. The network device 300 may greatly vary due to different configurations or performance. The network device 300 may include one or more processors 301 and one or more memories 302, where the memory 302 stores at least one instruction, and the at least one instruction is loaded and executed by the processor 301, to implement a step performed by the forwarding node in the following method embodiments. Apparently, the network device 300 may further have components such as a wired or wireless network interface, a keyboard, and an input/output interface, to perform input/output. The network device 300 may further include another component configured to implement a device function.

For example, in an embodiment, a computer-readable storage medium is further provided, for example, a memory including instructions, where the instructions may be executed by a processor in a terminal to complete the service level configuration method in the embodiments described below. For example, the computer-readable storage medium may be a read-only memory (ROM), a random access memory (RAM), a compact disc read-only memory (CD-ROM), a tape, a floppy disk, an optical data storage device, or the like.

Figure 4:
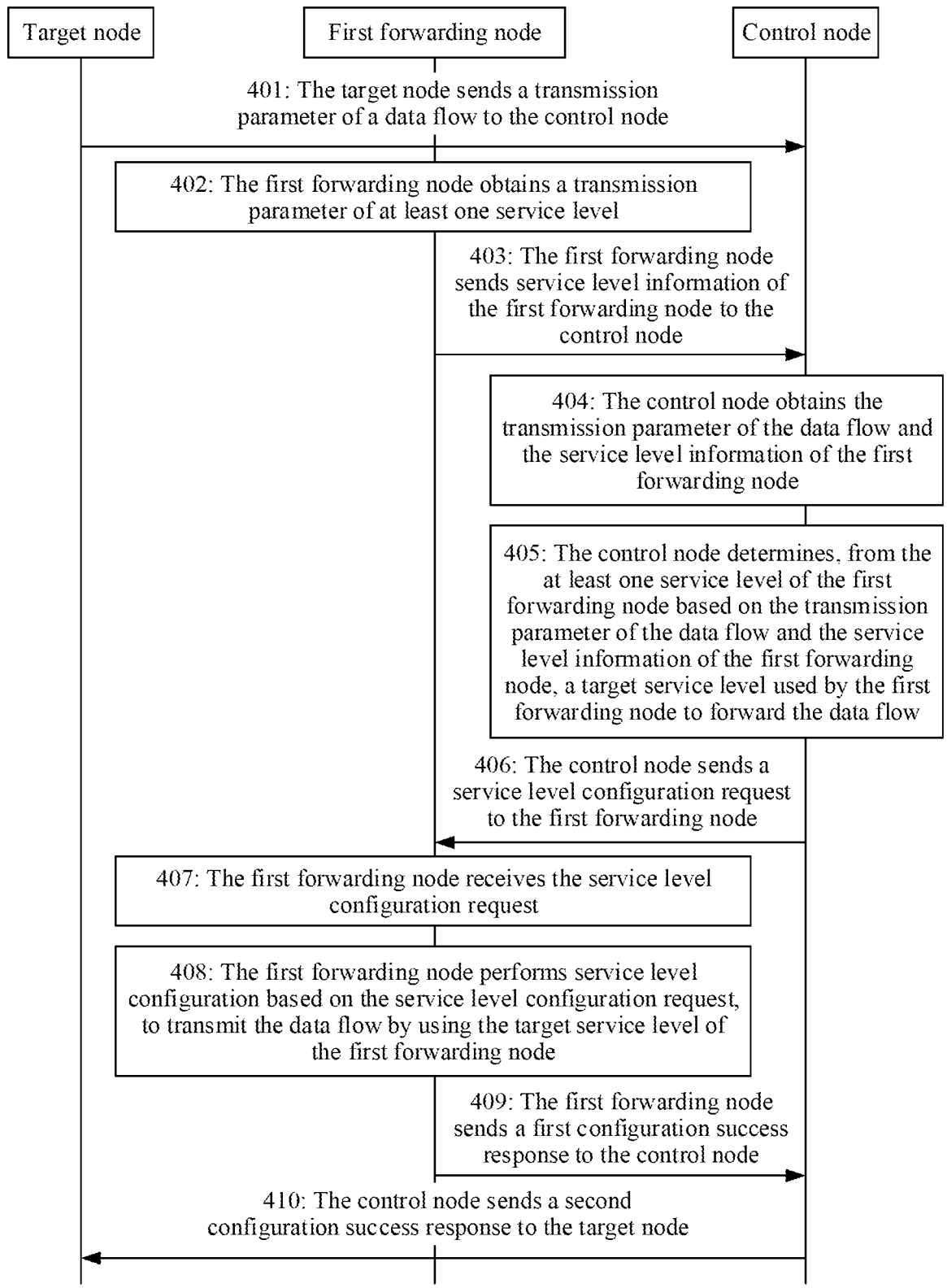
FIG. 4 is a flowchart of a service level configuration method according to an embodiment of this application.

The forwarding node may report service level information of the forwarding node to the control node, and then the control node determines, based on service level information of each forwarding node on the transmission path of the data flow and the transmission parameter of the data flow, a target service level in each forwarding node used to forward the data flow. Further, each forwarding node may perform service level configuration based on the target service level determined by the control node for each forwarding node, so that a subsequent forwarding node may forward the data flow by using a configured service level. To further describe the process, refer to a flowchart of a service level configuration method according to an embodiment of this application shown in FIG. 4. A process of the method may include the following steps 401 to 410.

401: A target node sends a transmission parameter of a data flow to a control node.

The target node may be any one of a target control node, a transmit node of the data flow, a forwarding node of the data flow, and a receive node of the data flow. The data flow may include at least one service flow, each service flow is a data flow of one service, a transmission parameter of one service flow is used to indicate a transmission feature and a service requirement of the service flow, and the transmission parameter of the one service flow may include at least one of a transmission delay of the service flow, a transmission bandwidth of the service flow, and a burst size of the service flow. The transmission delay of the service flow may be a delay requirement of the service flow; in other words, a transmission delay of the service flow in the transmission requirement on a transmission path. The transmission delay may also be considered as a transmission feature of the service flow. The transmission bandwidth of the service flow may be a transmission rate requirement of the service flow; in other words, a transmission rate of the service flow in the service requirement on the transmission path. In other words, the transmission rate is a transmission feature of the service flow. The burst size of the service flow is a data amount of burst data generated when the service flow is transmitted on the transmission path. The burst size of the service flow may also be considered as a burst requirement of the service flow; in other words, a transmission feature of the service flow. The delay requirement, the transmission rate requirement, and the burst requirement may all be considered as service requirements.

The transmission parameter of the data flow may include at least one of the transmission delay of the data flow, the transmission bandwidth of the data flow, and the burst size of the data flow. The transmission parameter of the data flow is a smallest transmission delay in transmission delays of all service flows in the data flow, the transmission bandwidth of the data flow is a sum of transmission bandwidths of all service flows in the data flow, and the burst size of the data flow is a sum of burst sizes of all service flows in the data flow.

402: A first forwarding node obtains a transmission parameter of at least one service level.

The first forwarding node is any forwarding node on the transmission path of the data flow. The first forwarding node has at least one forwarding queue, each forwarding queue corresponds to one service level, and one service level may also correspond to a plurality of forwarding queues. For example, service levels of forwarding queues 1 to 3 are all A, and a service level of forwarding queue 4 is B. A packet in the data flow may be queued in forwarding queues having a same service level. For any service level, the first forwarding node may transmit, by using a transmission parameter of the service level, a packet in a forwarding queue corresponding to the service level.

A transmission parameter of one service level is used to indicate a maximum transmission parameter that can be reached when the data flow is forwarded by using the service level. The transmission parameter of the one service level may include at least one of the following: a forwarding delay, a service burst size, and a service bandwidth that correspond to the service level, where the service burst size is a maximum burst size allowed when at least one data flow is forwarded by using the service level, and the service bandwidth is a maximum bandwidth allowed when at least one data flow is forwarded by using the service level.

For any service level in the at least one service level, the first forwarding node may obtain the transmission parameter of the service level based on a forwarding capability of the first forwarding node for forwarding the data flow, where a port bandwidth of the first forwarding node may be used to indicate the forwarding capability of the first forwarding node to forward the data flow. In a possible implementation, a process in which the first forwarding node obtains the transmission parameter of the one service level may include the following steps 4021 to 4024.

Step 4021: For any service level in the at least one service level, the first forwarding node obtains a queuing delay of the service level, where the queuing delay is a maximum duration for a packet in the data flow to wait in a forwarding queue corresponding to the service level.

The first forwarding node may obtain the queuing delay of the service level based on an operation of a user. In a possible implementation, the user may add a queuing delay of the at least one service level on a delay configuration interface of the first forwarding node. After the addition is completed, the user may click a determining button on the delay configuration interface. If the first forwarding node detects an action of clicking the determining button by the user, the first forwarding node may be triggered to obtain the queuing delay of the at least one service level added by the user. Therefore, the first forwarding node may obtain the queuing delay of the service level from the queuing delay of the at least one service level. For example, for a port with 1 GB bandwidth of the first forwarding node, the port has four service levels, which are respectively denoted as service levels A, B, C, and D. Queuing delays allocated by the user, in some embodiments, to the four service levels are 0.5 ms, 1 ms, 2 ms, and 4 ms respectively. The user adds the queuing delay allocated to each service level on the delay configuration interface, so that the first forwarding node may obtain the queuing delays of the service levels A to D.

Step 4022: The first forwarding node determines, based on the queuing delay of the service level, a forwarding delay corresponding to the service level.

The forwarding delay of the service level is also maximum duration of transmitting the data flow by using the service level. The first forwarding node may determine the queuing delay of the service level as the forwarding delay corresponding to the service level, or the first forwarding node may further determine a sum of the queuing delay of the service level and an inherent delay of the first forwarding node as the forwarding delay corresponding to the service level.

The inherent delay of the first forwarding node may be a delay caused by a hardware structure of the first forwarding node. The inherent delay of the first forwarding node may also be considered as a minimum delay of the data flow on the first forwarding node. In other words, after the first forwarding node receives the data flow, the data flow does not need to be queued on the first forwarding node, and is directly forwarded by the first forwarding node, so that a forwarding delay of the data flow on the first forwarding node is the inherent delay of the first forwarding node. In other words, the inherent delay of the first forwarding node is duration from when the first forwarding node receives any packet in the data flow to when the first forwarding node outputs the packet in a case that the data flow is not queued. The inherent delay of the first forwarding node may include a port delay of the first forwarding node and a task delay of the first forwarding node, where the port delay is duration for the first forwarding node to send a packet in the data flow to a port of the first forwarding node, and the task delay is duration for the first forwarding node to allocate a forwarding task for the packet in the data flow.

Step 4023: The first forwarding node determines, based on the forwarding delay corresponding to the service level, the port bandwidth of the first forwarding node, and a data forwarding amount corresponding to the service level, a maximum burst size corresponding to the service level. The data forwarding amount is a data amount of data to be forwarded by the first forwarding node in the forwarding queue corresponding to the service level at a single time.

Before step 4023 is performed, the first forwarding node may first obtain the data forwarding amount corresponding to the service level, where the data forwarding amount corresponding to the service level is also referred to as a data amount of data to be forwarded from the forwarding queue when the first forwarding node polls the forwarding queue corresponding to the service level. The data forwarding amount in each polling process of the first forwarding node is less than or equal to a total forwarding amount of the port. For example, if a total forwarding amount is 10,000 bits, and data forwarding amounts corresponding to service levels A to D are both 10,000 bits, the first forwarding node may first poll a forwarding queue A corresponding to the service level A, and output 10000-bit data in the forwarding queue A. Then, the first forwarding node polls a forwarding queue B corresponding to the service level B, and outputs 10000-bit data in the forwarding queue B. The same applies to analogy. The first forwarding node continues to poll a forwarding queue corresponding to the service level C. For another example, one port of the first forwarding node has service levels E and F whose corresponding forwarding amounts are both 5,000 bits, and a total forwarding amount of the port is 10,000 bits. In one polling process, the first forwarding node forwards 5000-bit data from a forwarding queue E corresponding to the service level E, and forwards 5000-bit data from a forwarding queue F corresponding to the service level F. It should be noted that, data forwarding amounts corresponding to the at least one service level may be the same or different. For example, data forwarding amounts corresponding to the service levels A to D may be 8,000 bits, 4,000 bits, 2,000 bits, and 1,000 bits respectively. The data forwarding amount corresponding to the service level is not specifically limited in this embodiment of this application.

The first forwarding node may obtain the data forwarding amount corresponding to the service level based on an operation of the user. In a possible implementation, the user may add a data forwarding amount corresponding to the at least one service level on a data amount configuration interface of the first forwarding node, where one service level corresponds to one data forwarding amount. After the addition is completed, the user may click a determining button on the data amount configuration interface. If the first forwarding node detects an action of clicking the determining button by the user, the first forwarding node may be triggered to obtain the data forwarding amount that corresponds to the at least one service level and that is added by the user. Therefore, the first forwarding node may obtain the data forwarding amount corresponding to the service level from the data forwarding amount corresponding to the at least one service level.

For an $i^{th}$ service level in the at least one service level, the first forwarding node may use a forwarding delay corresponding to the $i^{th}$ service level, the port bandwidth of the first forwarding node, and the data forwarding amount corresponding to the at least one service level as input parameters of the following formulas (1) to (3), and perform calculation through the formulas (1) to (3) by using the input parameters, to obtain a maximum burst size of the $i^{th}$ service level, where $1 \leq i$, $\beta_i$ is used to indicate a service curve showing that the $i^{th}$ service level changes with time t, the service curve is used to describe a minimum service capability of the first forwarding node within any time interval, $Q_i$ is a data forwarding amount corresponding to the $i^{th}$ service level, $L_i$ is a data amount of a largest packet in a forwarding queue corresponding to the $i^{th}$ service level, $L_{maxL}$ is a data amount of a largest packet in a data flow that is not transmitted by the first forwarding node by using a service level, $1 \leq j \leq n$, n is a quantity of at least one service level, t is time, T is time when $\beta_i$ is 0 (in other words, time when $\beta_i$ reaches 0), and R is a slope of the service curve $\beta_i$. The first forwarding node may convert formula (1) into a form of formula (2), to obtain R from formula (1) after conversion, where R may be represented by using at least one of the data forwarding amount of the at least one service level, the port bandwidth, $L_{maxL}$, and $L_i$. The first forwarding node then substitutes R, a use queuing delay D of the $i^{th}$ service level, and T into formula (3), to obtain a service burst size b corresponding to the $i^{th}$ service level.

$$\beta_i = c\left(t - \frac{L_{max,L}}{c}\right)\frac{Q_i}{\sum_{j=1}^{n} Q_j} - \frac{Q_i\left(\sum_{j\neq 1} L_j\right) + \left(\sum_{j\neq 1} Q_j\right)(Q_i + L_i)}{\sum_{j=1}^{n} Q_j} \quad (1)$$

$$\beta_i = R(t - T) \quad (2)$$

$$D = \frac{b}{R} + T \quad (3)$$

Step 4024: The first forwarding node determines, based on the port bandwidth of the first forwarding node and the data forwarding amount corresponding to the service level, a service bandwidth corresponding to the service level.

For the $i^{th}$ service level, the first forwarding node may input the port bandwidth of the first forwarding node and the data forwarding amount corresponding to the at least one service level into formula (4), and calculate a service bandwidth r of the $i^{th}$ service level through formula (4).

$$r = c \times \frac{Q_i}{\sum_{j=1}^{n} Q_j} \quad (4)$$

Figure 5:
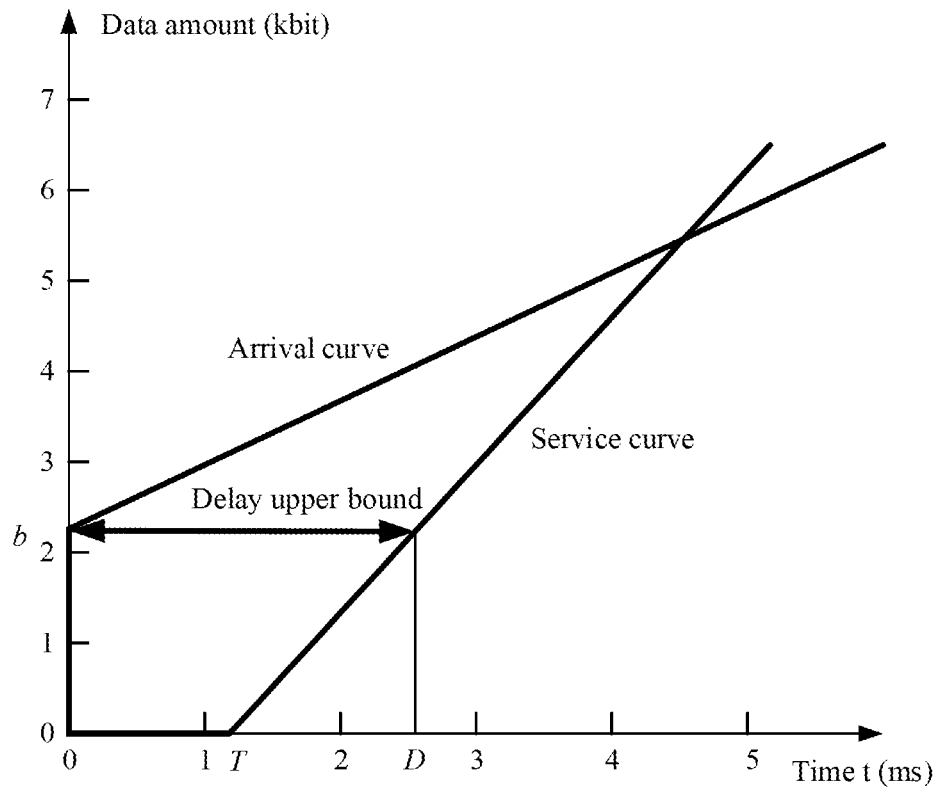
FIG. 5 is a schematic diagram of determining a transmission parameter of a service level according to an embodiment of this application.

For any service level in the at least one service level, the first forwarding node may obtain a transmission parameter of the any service level by using the processes shown in steps 4021 to 4024. It should be noted that, for any service level, a forwarding delay, a service burst size, and a service bandwidth that correspond to the service level affect each other. For example, FIG. 5 shows a schematic diagram of determining a transmission parameter of a service level according to an embodiment of this application. In FIG. 5, a service curve is $\beta_i$, and an arrival curve is used to describe an upper bound of a data amount that the first forwarding node arrives within any time interval, and D is a maximum horizontal spacing between the arrival curve and the service curve; in other words, a forwarding delay corresponding to the $i^{th}$ service level. It can be seen that, if any parameter of D, the service curve, and the arrival curve changes, the other parameters change accordingly. For example, when D changes, the first forwarding node may dynamically adjust the service curve and the arrival curve to ensure that a changed D is available. Therefore, for any service level, the first forwarding node may first determine specific values of any two items of a transmission delay, a service burst size, and a service bandwidth that correspond to the service level, and then determine a specific value of a remaining item based on the determined specific values of the any two items and the foregoing formulas (1) to (4). Therefore, a transmission parameter of each service level of the first forwarding node may have a plurality of cases, and is not unique.

It should be noted that, the first forwarding node may further allocate buffer space to the forwarding queue corresponding to the service level, where the buffer space is used to provide a packet for the forwarding queue. For the data flow of the service level, the first forwarding node may buffer a packet in the data flow in the buffer space of the forwarding queue. After any packet in the forwarding queue is forwarded, the first forwarding node may transfer a packet in the buffer space of the forwarding queue to the forwarding queue for the packet to queue in the forwarding queue. In this way, it is avoided that a large quantity of packets in the data flow are lost on the first forwarding node.

403: The first forwarding node sends service level information of the first forwarding node to the control node, where the service level information of the first forwarding node includes a transmission parameter of at least one service level of the first forwarding node.

A transmission parameter of one service level may further include a target identifier. When a maximum buffer size of the buffer space of the forwarding queue corresponding to the service level is greater than or equal to a service burst size corresponding to the service level, the target identifier is a first identifier, where the first identifier is used to indicate that a packet loss does not occur when the data flow is forwarded by using the service level. Otherwise, the target identifier is a second identifier, where the second identifier is used to indicate that a packet loss occurs when the data flow is forwarded by using the service level. A manner of representing the first identifier and the second identifier is not specifically limited in this embodiment of this application.

The transmission parameter of the one service level may further include a jitter threshold, where the jitter threshold is a jitter upper bound of an actual forwarding delay generated when the data flow is forwarded by using the service level, and the jitter threshold is a difference between a forwarding delay corresponding to the service level and the inherent delay of the first forwarding node. The transmission parameter of the one service level may further include the inherent delay of the forwarding node.

The transmission parameter of the one service level may further include a confidence probability corresponding to the service level, where the confidence probability is a probability that an actual forwarding delay generated when the data flow is forwarded by using the service level is less than or equal to the forwarding delay corresponding to the service level. The confidence probability may be 100%, or may be another value. A value of the confidence probability corresponding to the service level is not specifically limited in this embodiment of this application.

Figure 6:
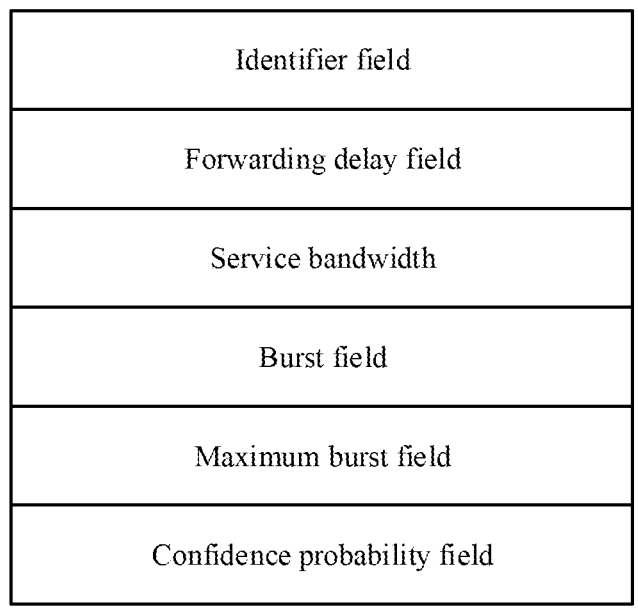
FIG. 6 is a schematic diagram of a target packet format according to an embodiment of this application.

The first forwarding node may generate the service level information based on a target packet format in a service level protocol, where the target packet format may be tag-length-value (TLV). An identifier field in the target packet format is used to store a service level identifier of each service level of each port of the first forwarding node. In a possible implementation, the identifier field may store a node identifier of the first forwarding node, a port identifier of each port, and a service level identifier of a service level of each port. A forwarding delay field in the target packet format is used to store a forwarding delay corresponding to each service level, a burst field in the target packet format is used to store a service burst size of each service level, and a bandwidth field in the target packet format is used to store a service bandwidth of each service level. The target packet format may further include a maximum burst field, used to store a maximum burst size of one data flow served by each service level. The target packet format may further include a target identifier field, used to store a target identifier corresponding to each service level. The target packet format may further include a jitter field, used to store a jitter threshold corresponding to each service level. The target packet format may further include a minimum delay field, used to store the inherent delay of the first forwarding node. The target packet format may further include a confidence probability field, used to store a confidence probability corresponding to each service level. For example, FIG. 6 shows a schematic diagram of a target packet format according to an embodiment of this application.

It should be noted that, in this embodiment of this application, step 402 and step 403 may be performed first, and then step 401 is performed. An execution sequence of steps 401 to 403 is not specifically limited in this embodiment of this application.

404: The control node obtains the transmission parameter of the data flow and the service level information of the first forwarding node, where the service level information of the first forwarding node includes a transmission parameter of at least one service level of the first forwarding node.

The transmission path of the data flow may include only the first forwarding node, or may include a second forwarding node other than the first forwarding node. The control node may obtain the transmission parameter of the data flow by receiving the transmission parameter that is of the data flow and that is sent by the target node. The control node may obtain the service level information of the first forwarding node by receiving the service level information sent by the first forwarding node. Alternatively, each time after receiving service level information of a forwarding node, the control node stores the service level information of the forwarding node, and after receiving the transmission parameter of the data flow, the control node determines, based on the transmission path of the data flow, the first forwarding node on the transmission path. The control node may filter out the service level information of the first forwarding node from the stored service level information of the plurality of forwarding nodes.

405: The control node determines, from the at least one service level of the first forwarding node based on the transmission parameter of the data flow and the service level information of the first forwarding node, a target service level used by the first forwarding node to forward the data flow, where a transmission parameter of the target service level of the first forwarding node and the transmission parameter of the data flow meet a first target condition.

The first target condition may include at least one of the following: A forwarding delay corresponding to the target service level of the first forwarding node is less than or equal to the transmission delay of the data flow (condition 1), a sum of the burst size of the data flow and a burst size of a data flow currently served by the target service level of the first forwarding node is less than or equal to a service burst size corresponding to the target service level of the first forwarding node (condition 2), and a sum of the transmission bandwidth and a transmission bandwidth of the data flow currently served by the target service level of the first forwarding node is less than or equal to a service bandwidth corresponding to the target service level of the first forwarding node (condition 3). In a possible implementation, the condition 1 may further be that a sum of the forwarding delay corresponding to the target service level of the first forwarding node and a target delay is less than or equal to the transmission delay, where the target delay is an inherent delay of the transmission path of the data flow, or the target delay is a time in the process of transmitting the data flow on the forwarding path excluding a time that the forwarding node forwards the data flow. The inherent delay of the transmission path may include a transmission delay between nodes on the transmission path, and the transmission delay between nodes on the transmission path may include a transmission delay between a transmit node and an initial forwarding node on the transmission path, a transmission delay between forwarding nodes, and a transmission delay between a last forwarding node on the transmission path and a receive node, where the transmission delay between nodes may be an optical fiber delay, or may be a delay caused by another material used to transmit the data flow. The inherent delay of the transmission path may further include an inherent delay of a forwarding node on the transmission path; in other words, the inherent delay of the transmission path may further include a port delay and a task delay of the forwarding node on the transmission path. The inherent delay of the transmission path may be a sum of the transmission delay between nodes on the transmission path and the inherent delay of the forwarding node on the transmission path.

When content in the transmission parameter of the data flow corresponds to content of the target condition, if the transmission parameter of the data flow includes only the transmission delay of the data flow, the first target condition is condition 1; if the transmission parameter of the data flow includes the transmission delay and the burst size of the data flow, the first target condition includes conditions 1 and 2; and if the transmission parameter of the data flow includes the transmission delay, the burst size, and the bandwidth of the data flow, the first target condition includes conditions 1 to 3.

The control node may use the first target condition as a maximum constraint condition, and filter out the target service level of the first forwarding node from the at least one service level of the first forwarding node based on the transmission parameter of the data flow and the transmission parameter of the at least one service level of the first forwarding node. For example, assume that the transmission path includes only the first forwarding node, the first forwarding node includes service levels A and B, and the first target condition includes conditions 1 to 3. If a forwarding delay corresponding to the service level A is less than or equal to the transmission delay of the data flow, a sum of a burst size of a data flow currently served by the service level A and the burst size of the data flow is less than or equal to a service burst size corresponding to the service level A, and a sum of the transmission bandwidth of the data flow and a transmission bandwidth of the data flow currently served by the service level A is less than or equal to a service bandwidth corresponding to the service level A, the control node may use the service level A as the target service level. Otherwise, the control node may determine the service level B. If a transmission parameter of the service level B and the transmission parameter of the data flow meet the first target condition, the service level B is used as the target service level.

When the transmission path of the data flow includes a plurality of forwarding nodes, transmission parameters of target service levels of the plurality of forwarding nodes and the transmission parameter of the data flow may further meet a second target condition. In a possible implementation, the control node may further perform the processes shown in the following steps 1 and 2 to obtain a target service level of a second forwarding node on the transmission path.

Step 1: The control node obtains service level information of the second forwarding node, where the second forwarding node is a node other than the first forwarding node on the transmission path of the data flow.

In this application, service level information of any forwarding node may include a transmission parameter of at least one service level of the forwarding node. Therefore, service level information of the second forwarding node may include a transmission parameter of at least one service level of the second forwarding node. A process in which the control node obtains the service level information of the second forwarding node is similar to the process in which the control node obtains the service level information of the first forwarding node in step 404. In this embodiment of this application, step 1 is not described again herein.

Step 2: The control node determines, from at least one service level of the second forwarding node based on the transmission parameter of the data flow, the service level information of the first forwarding node, and the service level information of the second forwarding node, a target service level used by the second forwarding node to forward the data flow, where the transmission parameter of the target service level of the first forwarding node, a transmission parameter of the target service level of the second forwarding node, and the transmission parameter of the data flow meet the second target condition.

The second target condition may include at least one of the following: A sum of the forwarding delay corresponding to the target service level of the first forwarding node and a forwarding delay corresponding to the target service level of the second forwarding node is less than or equal to the transmission delay (condition a); for either one of the first forwarding node and the second forwarding node, a sum of the burst size of the data flow and a burst size of a data flow currently served by the target service level of the node is less than or equal to a service burst size corresponding to the target service level of the node (condition b); and a sum of the transmission bandwidth of the data flow and a transmission bandwidth of the data flow currently served by the target service level of the node is less than or equal to a service bandwidth corresponding to the target service level of the node (condition c).

In a possible implementation, the condition a may further be that a sum of the forwarding delay corresponding to the target service level of the first forwarding node, the forwarding delay corresponding to the target service level of the second forwarding node, and a target delay is less than or equal to the transmission delay of the data flow, where the target delay is an inherent delay of the transmission path.

When the transmission path includes a plurality of forwarding nodes, the condition a is also that a sum of forwarding delays corresponding to target service levels of the plurality of forwarding nodes is less than or equal to the transmission delay of the data flow. The condition a may further be that a sum of the forwarding delays corresponding to the target service levels of the plurality of forwarding nodes and the target delay is less than or equal to the transmission delay of the data flow.

The control node may use the second target condition as a maximum constraint condition, and perform solving based on the transmission parameter of the data flow, the transmission parameter of the at least one service level of the first forwarding node, and the transmission parameter of the at least one service level of the second forwarding node, to obtain the target service level of the first forwarding node and the target service level of the second forwarding node. The control node first randomly selects at least one group of service levels, where one group of service levels includes one service level of each forwarding node on the transmission path; in other words, one group of service levels includes one service level of the first forwarding node and one service level of the second forwarding node. For any group of service levels, if a transmission parameter of a service level in the group of service levels and the transmission parameter of the data flow meet the second target condition, each service level in the group of service levels is determined as a target service level of each forwarding node. Otherwise, the group of service levels cannot be used to serve the data flow, and a next group of service levels is determined until a transmission parameter of a service level in a group of service levels and the transmission parameter of the data flow meet the second target condition.

If the second target condition includes conditions a to c, for any group of service levels, the control node may perform summation on forwarding delays corresponding to all service levels in the group of service levels, to obtain a target sum value. If the condition a is that a sum of the forwarding delays corresponding to the target service levels of the plurality of forwarding nodes is less than or equal to the transmission delay of the data flow, the control node may compare the target sum value with the transmission delay of the data flow. When the target sum value is less than or equal to the transmission delay of the data flow, the group of service levels meets the condition a; otherwise, the group of service levels does not meet the condition a. If the condition a is that a sum of the forwarding delays corresponding to the target service levels of the plurality of forwarding nodes and the target delay is less than or equal to the transmission delay of the data flow, the control node compares a sum value of the target sum value and the target delay with the transmission delay of the data flow. When the sum value of the target sum value and the target delay is less than or equal to the transmission delay of the data flow, the group of service levels meets the condition a; otherwise, the group of service levels does not meet the condition a.

If the group of service levels does not meet the condition a, the control node does not adopt the group of service levels, and determines a next group of service levels. If the group of service levels meets the condition a, for any service level in the group of service levels, the control node may obtain a burst size of a data flow currently served by the service level, and then calculate a sum of the burst size of the data flow currently served by the service level and the burst size of the data flow (the sum value is denoted as a target burst size of the service level). The control node compares the target burst size of the service level with a service burst size corresponding to the service level. If the target burst size of the service level is less than or equal to the service burst size corresponding to the service level, the service burst size of the service level and the burst size of the data flow meet the condition b. If a service burst size of each service level in the group of service levels and the burst size of the data flow all meet the condition b, the group of service levels meets the condition b. Otherwise, the group of service levels does not meet the condition b.

If the group of service levels does not meet the condition b, the control node does not adopt the group of service levels, and determines on a next group of service levels. If the group of service levels meets the condition b, the control node may obtain a transmission bandwidth of a data flow currently served by the service level, and then calculate a sum of the transmission bandwidth of the data flow currently served by the service level and the transmission bandwidth of the data flow (the sum value is denoted as a target transmission bandwidth of the service level). The control node may then compare a service bandwidth corresponding to the service level with the target transmission bandwidth of the service level. If the target transmission bandwidth of the service level is less than or equal to the service bandwidth corresponding to the service level, the service bandwidth of the service level and the transmission bandwidth of the data flow meet the condition c. If a transmission bandwidth of each service level in the group of service levels and the transmission bandwidth of the data flow all meet the condition c, the group of service levels meets the condition c. Otherwise, the group of service levels does not meet the condition c.

If the group of service levels meets conditions a to c, a transmission parameter of the service level in the group of service levels and the transmission parameter of the data flow meet the second target condition. In this case, the control node may use each service level in the group of service levels as the target service level of each forwarding node on the transmission path.

Figure 7:
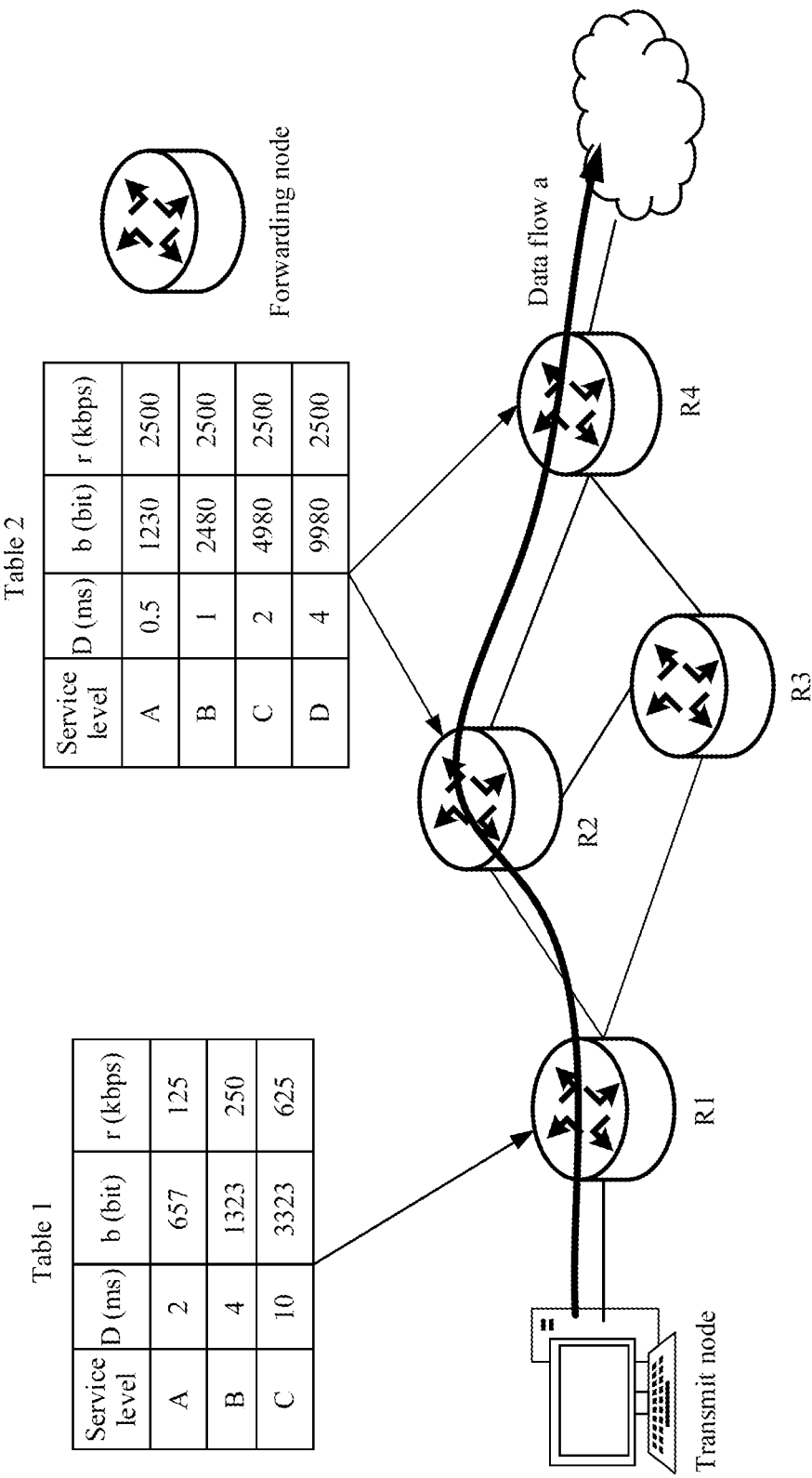
FIG. 7 is a schematic diagram of determining a target service level according to an embodiment of this application.

For example, FIG. 7 shows a schematic diagram of determining a target service level according to an embodiment of this application. A transmission delay of a data flow is 5 ms, a burst size is 100K bits, and a transmission bandwidth is 20 Mbps. A transmission path of the data flow a is a transmission path 1 in FIG. 7, and the transmission path 1 includes forwarding nodes R1, R2, and R4, where service level information of the forwarding node R1 is shown in Table 1 in FIG. 7, service level information of the forwarding nodes R2 and R4 is shown in Table 2 in FIG. 7, the forwarding node R1 has service levels A to C, forwarding delays corresponding to the service levels A to C are respectively 2 ms, 4 ms, and 10 ms, the forwarding nodes R2 and R4 each have service levels A to D, and forwarding delays corresponding to the service levels A to D are respectively 0.5 ms, 1 ms, 2 ms, and 4 ms. The control node may first use the service level A of the forwarding node R1, the service level B of the forwarding node R2, and the service level B of the forwarding node R4 as a group of service levels. In this case, if the forwarding nodes on the transmission path 1 transmit the data flow a by using the group of service levels, an actual transmission delay of the transmission path 1 may be 2+1+1+0.3<5 ms, where 0.3 ms is an inherent delay of the transmission path 1. In this case, the group of service levels meets the condition a. Then, the control node determines the service burst size 657 bits corresponding to the service level A of the forwarding node R1. If a sum of a burst size of a data flow currently served by the service level A of the forwarding node R1 and the burst size of the data flow a is less than or equal to 657 bits, a service burst size corresponding to the service level A of the forwarding node R1 and the burst size of the data flow a meet the condition b. Then, the control node determines the service bandwidth 125 kbps corresponding to the service level A of the forwarding node R1. If a sum of the transmission bandwidth of the data flow a and a transmission bandwidth of the data flow currently served by the service level A of the forwarding node R1 is less than or equal to 125 kbps, the service bandwidth of the service level A of the forwarding node R1 and the transmission bandwidth of the data flow a meet the condition c. If a transmission parameter of the service level A of the forwarding node R1 and the service level of the data flow a both meet the conditions a to c, the service level A of the forwarding node R1 meets the second target condition; otherwise, the service level A of the forwarding node R1 does not meet the second target condition. When the service level A of the forwarding node R1 meets the second target condition, the control node then determines the service level B of the forwarding node R2. When any service level in the group of service levels does not meet the second target condition, the control node determines a next group of service levels, and when all service levels in the group of service levels meet the second target condition, the control node uses the service level A of the forwarding node R1 as a target service level of the forwarding node R1, the service level B of the forwarding node R2 as a target service level of the forwarding node R2, and the service level B of the forwarding node R4 as a target service level of the forwarding node R4.

In a possible implementation, the target service level of the first forwarding node and the transmission parameter of the data flow may further meet only the condition 1 and the condition 3, but not the condition 2. Subsequently, a traffic shaping manner may be used to enable an actual burst size of the data flow and a service burst size of a target server to meet the condition 2.

In a possible implementation, when the burst size of the data flow is greater than the service burst size corresponding to the target service level of the first forwarding node, a traffic shaping request is sent to a node that is to be traffic shaped, where the traffic shaping request is used to indicate to perform traffic shaping on the data flow, and a burst size of the traffic shaped data flow is less than or equal to the service burst size corresponding to the target service level of the first forwarding node. The node that is to be traffic shaped is a forwarding node located before the first forwarding node on the transmission path of the data flow, a target terminal, or an initial forwarding node on the transmission path, where the target terminal is configured to send the data flow, and the target terminal is also a transmit node of the data flow.

When the node that is to be traffic shaped receives the traffic shaping request, the node that is to be traffic shaped may first perform traffic shaping on the data flow before outputting the data flow, so that the burst size of a traffic shaped data flow is less than or equal to the target service level of the first forwarding node. The node that is to be traffic shaped then outputs the traffic shaped data flow. It should be noted that, when service burst sizes corresponding to the target service levels of the plurality of forwarding nodes on the transmission path are all less than the burst size of the data flow, the first forwarding node is a forwarding node that is in the plurality of forwarding nodes and that has a smallest service burst size corresponding to the target service level.

It should be noted that, when the control node sends the traffic shaping request to the initial forwarding node on the transmission path, the condition a may further be that a sum of the forwarding delay corresponding to the target service level of the first forwarding node and the forwarding delay corresponding to the target service level of the second forwarding node is less than or equal to a first delay, where the first delay is a difference between the transmission delay and a traffic shaping delay. The traffic shaping delay may be expressed as (p−q)/f, where p is the service burst size corresponding to the target service level of the first forwarding node, q is the burst size of the data flow, and f is the transmission bandwidth of the data flow.

406: The control node sends a service level configuration request to the first forwarding node, where the service level configuration request is used to indicate to use the target service level of the first forwarding node to transmit the service flow.

When the transmission path of the data flow includes a plurality of forwarding nodes, for any forwarding node in the plurality of forwarding nodes, the control node may send a service level configuration request to the any forwarding node. For the service level configuration request sent to the any forwarding node, the service configuration request may include a service level identifier of a target service level of the forwarding node and a flow identifier of the data flow, and the flow identifier of the data flow is used to uniquely indicate the data flow. When the service burst size corresponding to the target service level of the first forwarding node is less than the burst size of the data flow, the service level configuration request further includes the service burst size corresponding to the target service level of the first forwarding node.

Figure 8:
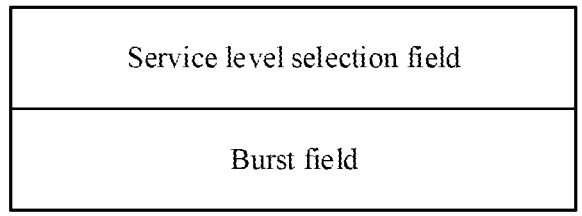
FIG. 8 is a schematic diagram of a first packet format according to an embodiment of this application.

Before step 406 is performed, the control node may generate the service level configuration request based on a first packet format in a service level protocol, where the first packet format may be TLV. A service level selection field in the first packet format is used to store a service level identifier of the target service level of the first forwarding node and the flow identifier of the data flow, and a burst field in the first packet format is used to store the service burst size corresponding to the target service level of the first forwarding node, to indicate the node that is to be traffic shaped to perform traffic shaping on the data flow, so that the burst size of a traffic shaped data flow does not exceed the service burst size of the target service level of the first forwarding node. For example, FIG. 8 shows a schematic diagram of a first packet format according to an embodiment of this application.

407: The first forwarding node receives the service level configuration request.

408: The first forwarding node performs service level configuration based on the service level configuration request, to transmit the data flow by using the target service level of the first forwarding node.

The first forwarding node may perform associative storage on the service level identifier of the target service level and the flow identifier of the data flow that are included in the service configuration request, to implement service level configuration. After the first forwarding node receives the data flow, the first forwarding node may determine, by searching for the service level identifier associated with the flow identifier of the data flow, the target service level corresponding to the data flow, so that the first forwarding node may transmit the data flow based on the target service level corresponding to the data flow.

The associative storage may be to store the service level identifier of the target service level of the first forwarding node and the flow identifier of the data flow in a service level configuration table for subsequent searching. When the first forwarding node has a plurality of ports, the first forwarding node may further store, in the service level configuration table, the service level identifier of the target service level of the first forwarding node, the flow identifier of the data flow, and a port identifier of a port used by the first forwarding node to forward the data flow. For example, in a service level configuration table shown in Table 3, when a data flow 1 is received, the first forwarding node may search Table 3 and forward the data flow 1 on a port 1 by using a service level A of the port 1; and when a data flow 2 is received, the first forwarding node may search Table 3 and forward the data flow 2 on a port 2 by using a service level A of the port 2.

TABLE 3

| Flow identifier | Service level identifier | Port identifier |
|---|---|---|
| Data flow 1 | Service level A | Port 1 |
| Data flow 2 | Service level A | Port 2 |

409: The first forwarding node sends a first configuration success response to the control node, where the first configuration success response is used to indicate that the service level configuration performed on the data flow is successful.

The first configuration success response may carry the flow identifier of the data flow and a node identifier of the first forwarding node. The node identifier of the first forwarding node is used to uniquely indicate the first forwarding node, and the node identifier may be a network address of the first forwarding node or a node identifier registered by the first forwarding node on the control node. A representation manner of the node identifier is not specifically limited in this embodiment of this application.

410: The control node sends a second configuration success response to the target node, where the second configuration success response is used to indicate that the service level configuration performed by each forwarding node on the data flow is successful.

When there is only one first forwarding node on the transmission path of the data flow, if the control node receives the first configuration success response sent by the first forwarding node, the forwarding node on the transmission path completes service level configuration for the data flow, and the control node may perform step 410. When there are a plurality of forwarding nodes on the transmission path of the data flow, the control node sends a service level configuration request to the plurality of forwarding nodes, so that the plurality of forwarding nodes may perform service level configuration based on a target service level carried in the received service level configuration request. After any forwarding node successfully completes configuration, the any forwarding node sends a first configuration success response to the control node. If the control node receives a first configuration success response sent by each forwarding node on the transmission path, the forwarding node on the transmission path completes service level configuration for the data flow, and the control node may perform step 410. It should be noted that the service level configuration request sent to any forwarding node is used to indicate to use the target service level of the any forwarding node to transmit the data flow. Target service levels of all forwarding nodes may be the same or different, and the target service levels of all forwarding nodes are determined by a second target condition.

The second configuration success response may include the flow identifier of the data flow and a node identifier of the control node. The node identifier of the control node is used to uniquely indicate the control node, and may be a network address of the control node. The node identifier of the control node is not specifically limited in this embodiment of this application.

When the service burst size of the first forwarding node is less than the burst size of the data flow, and the target node is the transmit node of the data flow, the second configuration success response may further include the service burst size of the first forwarding node, to indicate the target node to perform traffic shaping on the data flow, so that a burst size of a traffic shaped data flow is less than or equal to the service burst size of the first forwarding node.

Figure 9:
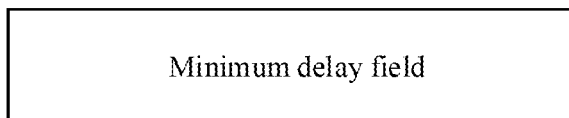
FIG. 9 is a schematic diagram of a minimum delay field of a second packet format according to an embodiment of this application.

The second configuration success response may further include a minimum transmission delay for the data flow to be input from the transmit node to the receive node, where the minimum transmission delay may be a target delay. For example, FIG. 9 shows a schematic diagram of a minimum delay field of a second packet format according to this embodiment of this application. When the control node generates the second configuration response based on the second packet format, the control node may add a minimum transmission delay of the data flow to the minimum delay field of the second packet format.

According to the method provided in this embodiment of this application, the target service level used by the first forwarding node to forward the data flow is directly determined based on the transmission parameter of the data flow and the service level information of the first forwarding node, and service level configuration is performed on the first forwarding node. Because the transmission parameter of the target service level of the first forwarding node and the transmission parameter of the data flow meet the first target condition, if the first target condition is a delay requirement required by a special service and the first forwarding node transmits the data flow by using the target service level, transmission of the data flow may meet the delay requirement required by the special service. When the sum of the forwarding delays corresponding to the target service levels of the forwarding nodes on the transmission path is less than or equal to the transmission delay of the data flow, if the forwarding nodes on the transmission path transmit the data flow by using the target service levels, it may be ensured that an actual transmission delay of the data flow can meet the transmission delay required by the service. When the sum of the burst size of the data flow and the burst size of the data flow currently served by the target service level of the forwarding node on the transmission path is less than or equal to the service burst size corresponding to the target service level, if the forwarding node on the transmission path transmits the data flow by using the target service level, it may be ensured that transmission of the data flow can still be completed while ensuring a service requirement even if a burst occurs on the data flow. When the sum of the transmission bandwidth of the data flow and the transmission bandwidth of the data flow currently served by the target service level of the forwarding node on the transmission path is less than or equal to the service bandwidth corresponding to the target service level of the forwarding node on the transmission path, if the forwarding node on the transmission path transmits the data flow by using the target service level, it may be ensured that an actual transmission bandwidth of the data flow can meet the transmission bandwidth required by the service. In addition, the control node determines the target service level of each forwarding node on the transmission path of the data flow, so that a service level may be dynamically configured.

Figure 10:
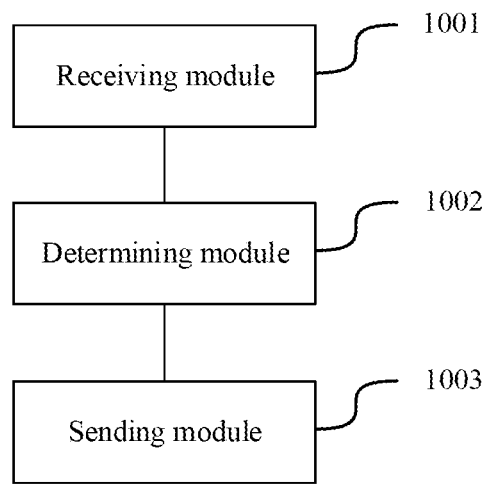
FIG. 10 is a schematic diagram of a structure of a service level configuration apparatus according to an embodiment of this application.

FIG. 10 is a schematic diagram of a structure of a service level configuration apparatus according to an embodiment of this application. The apparatus includes:

an obtaining module 1001, configured to obtain a transmission parameter of a data flow and service level information of a first forwarding node, where the service level information of the first forwarding node includes a transmission parameter of at least one service level of the first forwarding node;

a determining module 1002, configured to determine, from the at least one service level of the first forwarding node based on the transmission parameter of the data flow and the service level information of the first forwarding node, a target service level used by the first forwarding node to forward the data flow, where a transmission parameter of the target service level of the first forwarding node and the transmission parameter of the data flow meet a first target condition; and a sending module 1003, configured to send a service level configuration request to the first forwarding node, where the service level configuration request is used to indicate to use the target service level of the first forwarding node to transmit the data flow.

Optionally, the transmission parameter of the data flow includes a transmission delay, a burst size, and a transmission bandwidth of the data flow.

A transmission parameter of one service level includes a forwarding delay, a service burst size, and a service bandwidth that correspond to the service level, where the service burst size is a maximum burst size allowed when at least one data flow is forwarded by using the service level, and the service bandwidth is a maximum bandwidth allowed when at least one data flow is forwarded by using the service level.

Optionally, the first target condition includes at least one of the following:

a forwarding delay corresponding to the target service level of the first forwarding node is less than or equal to the transmission delay;

a sum of the burst size and a burst size of a data flow currently served by the target service level of the first forwarding node is less than or equal to a service burst size corresponding to the target service level of the first forwarding node; and a sum of the transmission bandwidth and a transmission bandwidth of the data flow currently served by the target service level of the first forwarding node is less than or equal to a service bandwidth corresponding to the target service level of the first forwarding node.

Optionally, the first target condition further includes:

a sum of the forwarding delay corresponding to the target service level of the first forwarding node and a target delay is less than or equal to the transmission delay, where the target delay is an inherent delay of a transmission path of the data flow.

Optionally, the obtaining module is further configured to obtain service level information of a second forwarding node, where the second forwarding node is a node other than the first forwarding node on the transmission path of the data flow.

The determining module is further configured to determine, from at least one service level of the second forwarding node based on the transmission parameter of the data flow, the service level information of the first forwarding node, and the service level information of the second forwarding node, a target service level used by the second forwarding node to forward the data flow, where the transmission parameter of the target service level of the first forwarding node, a transmission parameter of the target service level of the second forwarding node, and the transmission parameter of the data flow meet a second target condition.

Optionally, the second target condition includes at least one of the following:

a sum of the forwarding delay corresponding to the target service level of the first forwarding node and a forwarding delay corresponding to the target service level of the second forwarding node is less than or equal to the transmission delay;

for either one of the first forwarding node and the second forwarding node, a sum of the burst size and a burst size of a data flow currently served by a target service level of the node is less than or equal to a service burst size corresponding to the target service level of the node; and a sum of the transmission bandwidth and a transmission bandwidth of the data flow currently served by the target service level of the node is less than or equal to a service bandwidth corresponding to the target service level of the node.

Optionally, the second target condition further includes:

a sum of the forwarding delay corresponding to the target service level of the first forwarding node, the forwarding delay corresponding to the target service level of the second forwarding node, and a target delay is less than or equal to the transmission delay, where the target delay is an inherent delay of the transmission path.

Optionally, the inherent delay includes a transmission delay between nodes on the transmission path, a port delay of a forwarding node on the transmission path, and a task delay. The port delay is duration for the forwarding node to send a packet in the data flow to a port of the forwarding node, and the task delay is duration for the forwarding node to allocate a forwarding task for the packet in the data flow.

Optionally, the sending module is further configured to:

when the burst size is greater than the service burst size corresponding to the target service level of the first forwarding node, send a traffic shaping request to a node that is to be traffic shaped, where the traffic shaping request is used to indicate to perform traffic shaping on the data flow, and a burst size of the traffic shaped data flow is less than or equal to the service burst size corresponding to the target service level of the first forwarding node.

Optionally, the node that is to be traffic shaped is a forwarding node located before the first forwarding node on the transmission path of the data flow, a target terminal, or an initial forwarding node on the transmission path, where the target terminal is configured to send the data flow.

Optionally, the data flow includes at least one service flow.

The apparatus directly determines, based on the transmission parameter of the data flow and the service level information of the first forwarding node, the target service level used by the first forwarding node to forward the data flow, and performs service level configuration on the first forwarding node. Because the transmission parameter of the target service level of the first forwarding node and the transmission parameter of the data flow meet the first target condition, if the first target condition is a delay requirement required by a special service and the first forwarding node transmits the data flow by using the target service level, transmission of the data flow may meet the delay requirement required by the special service. When a sum of forwarding delays corresponding to target service levels of forwarding nodes on the transmission path is less than or equal to the transmission delay of the data flow, if the forwarding nodes on the transmission path transmit the data flow by using the target service levels, it may be ensured that an actual transmission delay of the data flow can meet the transmission delay required by the service. When a sum of the burst size of the data flow and a burst size of a data flow currently served by the target service level of the forwarding node on the transmission path is less than or equal to the service burst size corresponding to the target service level, if the forwarding node on the transmission path transmits the data flow by using the target service level, it may be ensured that transmission of the data flow can still be completed while ensuring a service requirement even if a burst occurs on the data flow. When a sum of the transmission bandwidth of the data flow and a transmission bandwidth of the data flow currently served by the target service level of the forwarding node on the transmission path is less than or equal to the service bandwidth corresponding to the target service level of the forwarding node on the transmission path, if the forwarding node on the transmission path transmits the data flow by using the target service level, it may be ensured that an actual transmission bandwidth of the data flow can meet the transmission bandwidth required by the service. In addition, a control node determines a target service level of each forwarding node on the transmission path of the data flow, so that a service level may be dynamically configured.

Figure 11:
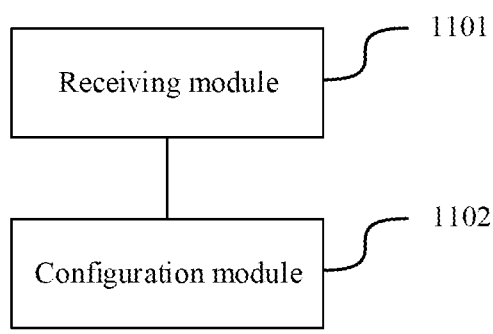
FIG. 11 is a schematic diagram of a structure of a service level configuration apparatus according to an embodiment of this application.

FIG. 11 is a schematic diagram of a structure of a service level configuration apparatus according to an embodiment of this application. The apparatus is disposed on a first forwarding node, and the apparatus includes:

a receiving module 1101, configured to receive a service level configuration request, where the service level configuration request is used to indicate to use a target service level of the apparatus to transmit a data flow, and a transmission parameter of the target service level of the apparatus and a transmission parameter of the data flow meet a first target condition; and a configuration module 1102, configured to perform service level configuration based on the service level configuration request, to transmit the data flow by using the target service level of the apparatus.

Optionally, the transmission parameter of the data flow includes a transmission delay, a burst size, and a transmission bandwidth of the data flow.

The target service level of the apparatus is any one of at least one service level of the apparatus. A transmission parameter of one service level includes a forwarding delay, a service burst size, and a service bandwidth that correspond to the service level, where the service burst size is a maximum burst size allowed when at least one data flow is forwarded by using the service level, and the service bandwidth is a maximum bandwidth allowed when at least one data flow is forwarded by using the service level.

Optionally, the first target condition includes at least one of the following:

a forwarding delay corresponding to the target service level of the apparatus is less than or equal to the transmission delay;

a sum of the burst size and a burst size of a data flow currently served by the target service level of the apparatus is less than or equal to a service burst size corresponding to the target service level of the apparatus; and a sum of the transmission bandwidth and a transmission bandwidth of the data flow currently served by the target service level of the apparatus is less than or equal to a service bandwidth corresponding to the target service level of the apparatus.

Optionally, the first target condition further includes:

a sum of the forwarding delay corresponding to the target service level of the apparatus and a target delay is less than or equal to the transmission delay, where the target delay is an inherent delay of a transmission path.

Optionally, the inherent delay includes a transmission delay between nodes on the transmission path, a port delay of a forwarding node on the transmission path, and a task delay of the forwarding node. The port delay is duration for the forwarding node to send a packet in the data flow to a port of the forwarding node, and the task delay is duration for the forwarding node to allocate a forwarding task for the packet in the data flow.

Optionally, the apparatus further includes:

an obtaining module, configured to obtain a transmission parameter of the at least one service level; and a sending module, configured to send service level information of the apparatus to a control node, where the service level information includes the transmission parameter of the at least one service level of the apparatus.

Optionally, the obtaining module includes:

an obtaining unit, configured to obtain, for any service level in the at least one service level, a queuing delay of the service level, where the queuing delay is maximum duration for a packet in a data flow to wait in a forwarding queue corresponding to the service level; and a determining unit, configured to determine, based on the queuing delay of the service level, a forwarding delay corresponding to the service level.

The determining unit is further configured to determine, based on the forwarding delay corresponding to the service level, a port bandwidth of the apparatus, and a data forwarding amount corresponding to the service level, a maximum burst size corresponding to the service level. The data forwarding amount is a data amount of data to be forwarded in the forwarding queue corresponding to the service level at a single time.

The determining unit is further configured to determine, based on the port bandwidth of the apparatus and the data forwarding amount corresponding to the service level, a service bandwidth corresponding to the service level.

Optionally, the determining unit is configured to:
determine the queuing delay of the service level as the forwarding delay corresponding to the service level; or
determine a sum of the queuing delay of the service level and an inherent delay of the first forwarding node as the forwarding delay corresponding to the service level.

Optionally, the apparatus further includes:
an allocation module, configured to allocate buffer space to the forwarding queue corresponding to the service level, where the buffer space is used to provide a packet for the forwarding queue.

Optionally, a transmission parameter of one service level further includes a target identifier. When a maximum buffer size of the buffer space is greater than or equal to a service burst size corresponding to the service level corresponding to the forwarding queue, the target identifier is a first identifier, where the first identifier is used to indicate that a packet loss does not occur when the data flow is forwarded by using the service level. Otherwise, the target identifier is a second identifier, where the second identifier is used to indicate that a packet loss occurs when the data flow is forwarded by using the service level.

Optionally, the transmission parameter of the one service level further includes a confidence probability corresponding to the service level, where the confidence probability is a probability that an actual forwarding delay generated when the data flow is forwarded by using the service level is less than or equal to the forwarding delay corresponding to the service level.

Optionally, the data flow includes at least one service flow.

Any combination of all the foregoing optional technical solutions may form embodiments of the present disclosure.

It should be noted that, when the service level configuration apparatus provided in the foregoing embodiments performs service level configuration, division of the foregoing functional modules is used as an example for description. In actual application, the foregoing functions may be allocated to different functional modules as required. In other words, the internal structure of the apparatus is divided into different functional modules, to implement all or part of the functions described above. In addition, the service level configuration method embodiments provided in the foregoing embodiments belong to a same idea. For a specific implementation process, refer to the method embodiments.

A person of ordinary skill in the art may understand that all or some of the steps of embodiments may be implemented by hardware or a program instructing related hardware. The program may be stored in a computer-readable storage medium. The storage medium may be a read-only memory, a magnetic disk, or an optical disc.

The foregoing descriptions are merely optional embodiments of this application, but are not intended to limit this application. Any modification, equivalent replacement, or improvement made without departing from the spirit and principle of this application should fall within the protection scope of this application.

What is claimed is:

1. A service level configuration method implemented by a first forwarding node, comprising:
sending service level information of the first forwarding node to a control node for determining a target service level of the first forwarding node, wherein the service level information includes a transmission parameter of at least one service level of the first forwarding node;
receiving a service level configuration request from the control node, wherein the service level configuration request indicates the target service level of the first forwarding node for transmitting a data flow, wherein the service level configuration request includes a service level identifier of the target service level of the first forwarding node and a flow identifier of the data flow, and wherein a transmission parameter of the target service level of the first forwarding node and a transmission parameter of the data flow meet a first target condition;
storing the service level identifier of the target service level of the first forwarding node and the flow identifier of the data flow; and
performing service level configuration based on the service level identifier and the flow identifier included in the service level configuration request, to transmit the data flow according to the target service level of the first forwarding node.

2. The method according to claim 1, wherein the transmission parameter of the data flow comprises a transmission delay, a burst size, and a transmission bandwidth of the data flow,
wherein the target service level of the first forwarding node is any one of at least one service level of the first forwarding node, and a transmission parameter of the one of at least one service level comprises a forwarding delay, a service burst size, and a service bandwidth that correspond to the service level, and wherein the service burst size is a maximum burst size allowed and the service bandwidth is a maximum bandwidth allowed when at least one data flow is forwarded by using the one of at least one service level.

3. The method according to claim 2, wherein the first target condition comprises at least one of the following:
a forwarding delay corresponding to the target service level of the first forwarding node is less than or equal to the transmission delay of the data flow;
a sum of the burst size of the data flow and a burst size of the data flow currently served by the target service level of the first forwarding node is less than or equal to a service burst size corresponding to the target service level of the first forwarding node; and
a sum of the transmission bandwidth of the data flow and a transmission bandwidth of the data flow currently served by the target service level of the first forwarding node is less than or equal to a service bandwidth corresponding to the target service level of the first forwarding node.

4. The method according to claim 3, wherein the first target condition further comprises:
a sum of the forwarding delay corresponding to the target service level of the first forwarding node and a target delay is less than or equal to the transmission delay of the data flow, wherein the target delay is an inherent delay of a transmission path.

5. The method according to claim 4, wherein the inherent delay comprises a transmission delay between nodes on the transmission path, a port delay of a forwarding node on the transmission path, and a task delay of the forwarding node, wherein the port delay is duration for the forwarding node to send a packet in the data flow to a port of the forwarding node, and the task delay is a duration for the forwarding node to allocate a forwarding task for the packet in the data flow.

6. The method according to claim 1, wherein before the receiving a service level configuration request, the method further comprises:

obtaining a transmission parameter of at least one service level of the first forwarding node; and
sending service level information of the first forwarding node to a control node, wherein the service level information comprises the transmission parameter of the at least one service level of the first forwarding node.

7. The method according to claim 6, wherein the obtaining a transmission parameter of the at least one service level comprises:
obtaining, for any service level in the at least one service level, a queuing delay of the service level, wherein the queuing delay is maximum duration for a packet in a data flow to wait in a forwarding queue corresponding to the service level;
determining, based on the queuing delay of the service level, a forwarding delay corresponding to the service level;
determining, based on the forwarding delay corresponding to the service level, a port bandwidth of the first forwarding node, and a data forwarding amount corresponding to the service level, a maximum burst size corresponding to the service level, wherein the data forwarding amount is a data amount of data to be forwarded in the forwarding queue corresponding to the service level at a single time; and
determining, based on the port bandwidth of the first forwarding node and the data forwarding amount corresponding to the service level, a service bandwidth corresponding to the service level.

8. The method according to claim 7, wherein the determining, based on the queuing delay of the service level, a forwarding delay corresponding to the service level comprises:
determining the queuing delay of the service level as the forwarding delay corresponding to the service level; or
determining a sum of the queuing delay of the service level and an inherent delay of the first forwarding node as the forwarding delay corresponding to the service level.

9. The method according to claim 7, wherein after the determining, based on the port bandwidth of the first forwarding node and the data forwarding amount corresponding to the service level, a service bandwidth corresponding to the service level, the method further comprises:
allocating buffer space to the forwarding queue corresponding to the service level, wherein the buffer space is used to provide a packet for the forwarding queue.

10. The method according to claim 9, wherein a transmission parameter of one service level further comprises a target identifier; and when a maximum buffer size of the buffer space is greater than or equal to a service burst size corresponding to the service level corresponding to the forwarding queue, the target identifier is a first identifier, wherein the first identifier is used to indicate that a packet loss does not occur when the data flow is forwarded by using the service level, or otherwise, the target identifier is a second identifier, wherein the second identifier is used to indicate that a packet loss occurs when the data flow is forwarded by using the service level.

11. A service level configuration apparatus disposed on a first forwarding node, comprising:
a memory storing programming instructions; and
one or more processors coupled to the memory, wherein the one or more processors are configured to execute the programming instructions stored in the memory to perform operations of:
sending service level information of the first forwarding node to a control node for determining a target service level of the apparatus disposed on the first forwarding node, wherein the service level information includes a transmission parameter of at least one service level of the apparatus;
receiving a service level configuration request from the control node, wherein the service level configuration request indicates the target service level of the apparatus for transmitting a data flow, wherein the service level configuration request includes a service level identifier of the target service level of the apparatus disposed on the first forwarding node and a flow identifier of the data flow, and wherein a transmission parameter of the target service level of the apparatus and a transmission parameter of the data flow meet a first target condition;
storing the service level identifier of the target service level of the apparatus disposed on the first forwarding node and the flow identifier of the data flow; and
performing service level configuration based on the service level identifier and the flow identifier included in the service level configuration request, to transmit the data flow according to the target service level of the apparatus.

12. The apparatus according to claim 11, wherein the transmission parameter of the data flow comprises a transmission delay, a burst size, and a transmission bandwidth of the data flow; and
the target service level of the apparatus is any one of at least one service level of the apparatus, and a transmission parameter of the one of at least one service level comprises a forwarding delay, a service burst size, and a service bandwidth that correspond to the service level, wherein the service burst size is a maximum burst size allowed when at least one data flow is forwarded by using the one of at least one service level, and the service bandwidth is a maximum bandwidth allowed when at least one data flow is forwarded by using the one of at least one service level.

13. The apparatus according to claim 12, wherein the first target condition comprises at least one of the following:
a forwarding delay corresponding to the target service level of the apparatus is less than or equal to the transmission delay of the data flow;
a sum of the burst size of the data flow and a burst size of the data flow currently served by the target service level of the apparatus is less than or equal to a service burst size corresponding to the target service level of the apparatus; and
a sum of the transmission bandwidth of the data flow and a transmission bandwidth of the data flow currently served by the target service level of the apparatus is less than or equal to a service bandwidth corresponding to the target service level of the apparatus.

14. The apparatus according to claim 13, wherein the first target condition further comprises:
a sum of the forwarding delay corresponding to the target service level of the apparatus and a target delay is less than or equal to the transmission delay of the date flow, wherein the target delay is an inherent delay of a transmission path.

15. The apparatus according to claim 14, wherein the inherent delay comprises a transmission delay between nodes on the transmission path, a port delay of a forwarding node on the transmission path, and a task delay of the forwarding node, wherein the port delay is duration for the forwarding node to send a packet in the data flow to a port of the forwarding node, and the task delay is a duration for the forwarding node to allocate a forwarding task for the packet in the data flow.

16. The apparatus according to claim 11, wherein the processor is further configured to invoke the program from the memory and run the program to perform:
   obtain a transmission parameter of at least one service level of the first forwarding node; and
   send service level information of the apparatus to a control node, wherein the service level information comprises the transmission parameter of the at least one service level of the apparatus.

17. The apparatus according to claim 16, wherein the processor is configured to invoke the program from the memory and run the program to perform:
   obtain, for any service level in the at least one service level, a queuing delay of the service level, wherein the queuing delay is maximum duration for a packet in a data flow to wait in a forwarding queue corresponding to the service level; and
   determine, based on the queuing delay of the service level, a forwarding delay corresponding to the service level, wherein
   the processor is further configured to invoke the program from the memory and run the program to perform determine, based on the forwarding delay corresponding to the service level, a port bandwidth of the apparatus, and a data forwarding amount corresponding to the service level, a maximum burst size corresponding to the service level, wherein the data forwarding amount is a data amount of data to be forwarded in the forwarding queue corresponding to the service level at a single time; and
   determine, based on the port bandwidth of the apparatus and the data forwarding amount corresponding to the service level, a service bandwidth corresponding to the service level.

18. The apparatus according to claim 17, wherein the processor is configured to invoke the program from the memory and run the program to perform:
   determine the queuing delay of the service level as the forwarding delay corresponding to the service level; or
   determine a sum of the queuing delay of the service level and an inherent delay of the first forwarding node as the forwarding delay corresponding to the service level.

19. The apparatus according to claim 17, wherein the processor is further configured to invoke the program from the memory and run the program to perform:
   allocate buffer space to the forwarding queue corresponding to the service level, wherein the buffer space is used to provide a packet for the forwarding queue.

20. The apparatus according to claim 19, wherein a transmission parameter of one service level further comprises a target identifier; and when a maximum buffer size of the buffer space is greater than or equal to a service burst size corresponding to the service level corresponding to the forwarding queue, the target identifier is a first identifier, wherein the first identifier is used to indicate that a packet loss does not occur when the data flow is forwarded by using the service level, or otherwise, the target identifier is a second identifier, wherein the second identifier is used to indicate that a packet loss occurs when the data flow is forwarded by using the service level.

21. A non-transitory computer readable medium storing instructions that, when executed by at least one processor of a first forwarding node in a communication network, causes the first forwarding node to perform operations of:
   sending service level information of the first forwarding node to a control node for determining a target service level of the first forwarding node, wherein the service level information includes a transmission parameter of at least one service level of the first forwarding node;
   receiving a service level configuration request from the control node, wherein the service level configuration request indicates the target service level of the first forwarding node for transmitting a data flow, wherein the service level configuration request includes a service level identifier of the target service level of the first forwarding node and a flow identifier of the data flow, and wherein a transmission parameter of the target service level of the first forwarding node and a transmission parameter of the data flow meet a first target condition;
   storing the service level identifier of the target service level of the first forwarding node and the flow identifier of the data flow; and
   performing service level configuration based on the service level identifier and the flow identifier included in the service level configuration request, to transmit the data flow according to the target service level of the first forwarding node.

* * * * *